Feb. 28, 1956 A. Z. ROBINSON ET AL 2,736,774

SOUND RECORDING SYSTEM

Filed July 2, 1952 2 Sheets-Sheet 1

INVENTORS
AARON Z. ROBINSON
IRVIN L. ROBEY

BY

ATTORNEYS

Feb. 28, 1956 A. Z. ROBINSON ET AL 2,736,774

SOUND RECORDING SYSTEM

Filed July 2, 1952 2 Sheets-Sheet 2

INVENTORS
AARON Z. ROBINSON
IRVIN L. ROBEY

BY

ATTORNEYS

United States Patent Office 2,736,774

Patented Feb. 28, 1956

2,736,774

SOUND RECORDING SYSTEM

Aaron Z. Robinson, Hyattsville, and Irvin L. Robey, Silver Spring, Md.

Application July 2, 1952, Serial No. 296,974

9 Claims. (Cl. 179—100.1)

Figure 1:
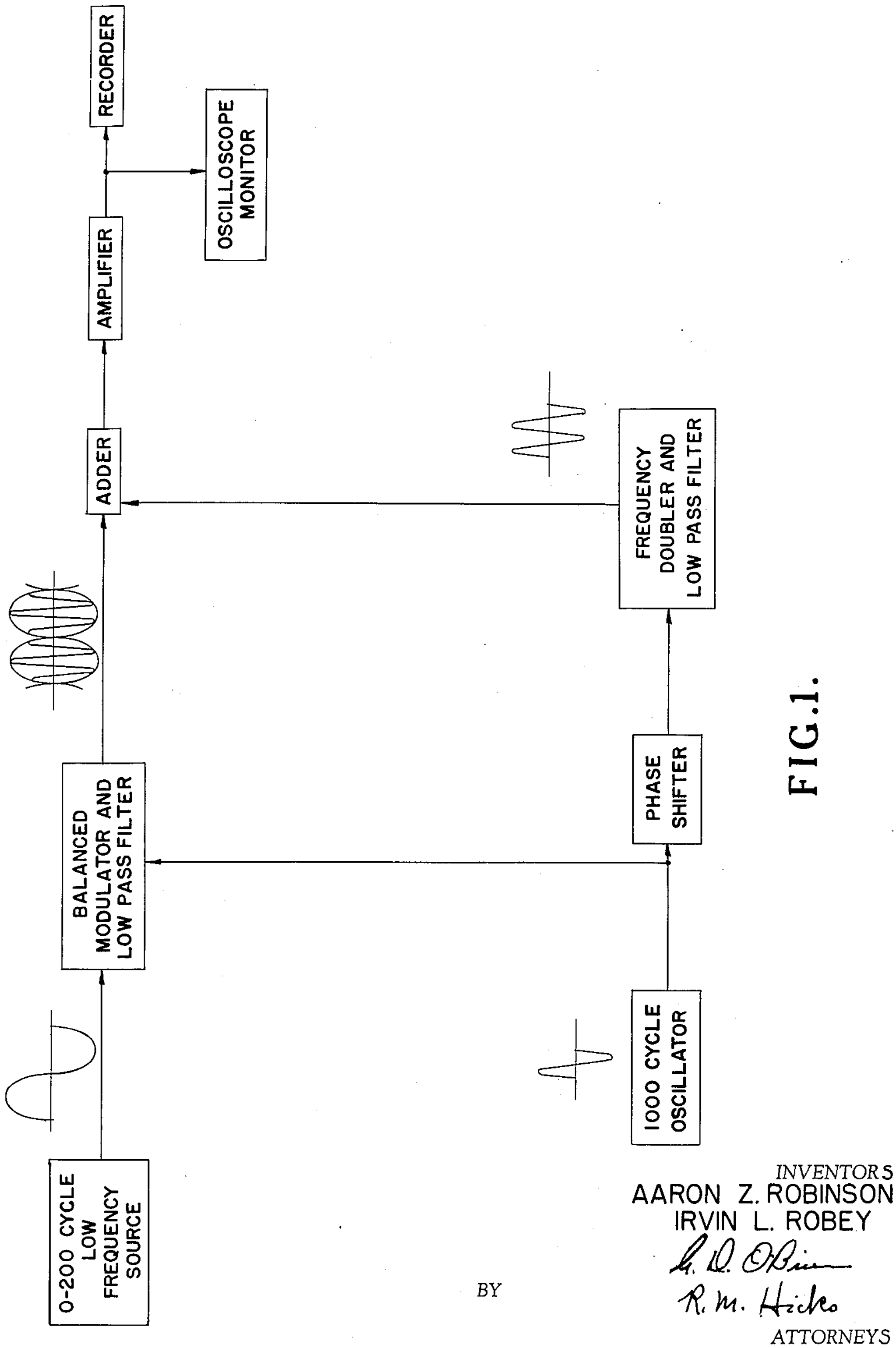

(Granted under Title 35, U. S. Code (1952), sec. 266)

The invention described herein may be manufactured and used by or for the Government of the United States of America for governmental purposes without the payment of any royalties thereon or therefor.

This invention relates to sound recording systems and particularly to one which increases greatly the usable dynamic range of recorded low frequency signals which vary in amplitude and provides undistorted output of the signal by preventing over modulation.

Low frequency signals of varying amplitude can be recorded by using a carrier frequency of approximately five times the highest signal frequency to be recorded and modulating the carrier by the low frequency signal. The modulated carrier signal is then demodulated using an average type demodulator provided the amplitude modulation does not exceed 100%. If the amplitude of modulation exceeds 100% then an active type demodulator and a lock-in system must be used in order that the demodulator restore the low frequency signal to its original form undistorted. Systems of this type are complicated and require the use of a frequency control circuit, gating circuits, pulse generators and D. C. amplifiers to provide variations in the carrier frequency corresponding to changes in the speed of the recorder or play back device. A fixed frequency oscillator would not drive the demodulator satisfactorily since it would have to follow the changing carrier frequency which results from turntable "wow," line frequency variations, etc. The maximum dynamic range of such a system, determined by tests, is about 36 db.

The system of the instant invention is an improvement over the heretofore used methods described above, in that it increases greatly the usable dynamic range of the recorded low frequency signals, eliminates the need for use of the complicated lock-in type system by a simpler system and overcomes the disadvantages of the methods heretofore used. Further, turntable speed does not affect the demodulator with respect to lock-in due to the insertion of a constant level control signal on the record which is harmonically related to the carrier.

The instant invention involves in the recording system the use of a carrier suppressed or balanced modulator to which a low frequency signal and a 1000 cycle per second signal are fed. The 1000 cycle per second signal is doubled in frequency and added in an adder circuit to the components of modulation, amplified and recorded.

In the play back system the recorded components of modulation or upper and lower sidebands and the doubled 1000 cycle per second signal are passed through low and high pass filters, respectively, to a demodulator and low pass filter. The filtered 2000 cycle per second signal is passed through a frequency halving circuit and fed to the demodulator and low-pass filter in phase with the sidebands or components of modulation.

In order to overcome the difficulties and disadvantages of the systems heretofore used to record low frequency signals, it is a primary object of the invention to provide a recording and play back system permitting a greatly increased usable dynamic range.

It is a further object of this invention to provide a low frequency recording and play back system wherein over modulation and the attendant distortion is eliminated.

It is a further object of this invention to provide a recording and play back system wherein turntable "wow," turntable speed, line frequency variations, etc. do not prevent the demodulator from restoring the low frequency signal to its original undistorted form.

It is a further object of this invention to provide a low frequency recording and play back system which is simple in construction and uses a minimum of equipment.

Figure 2:
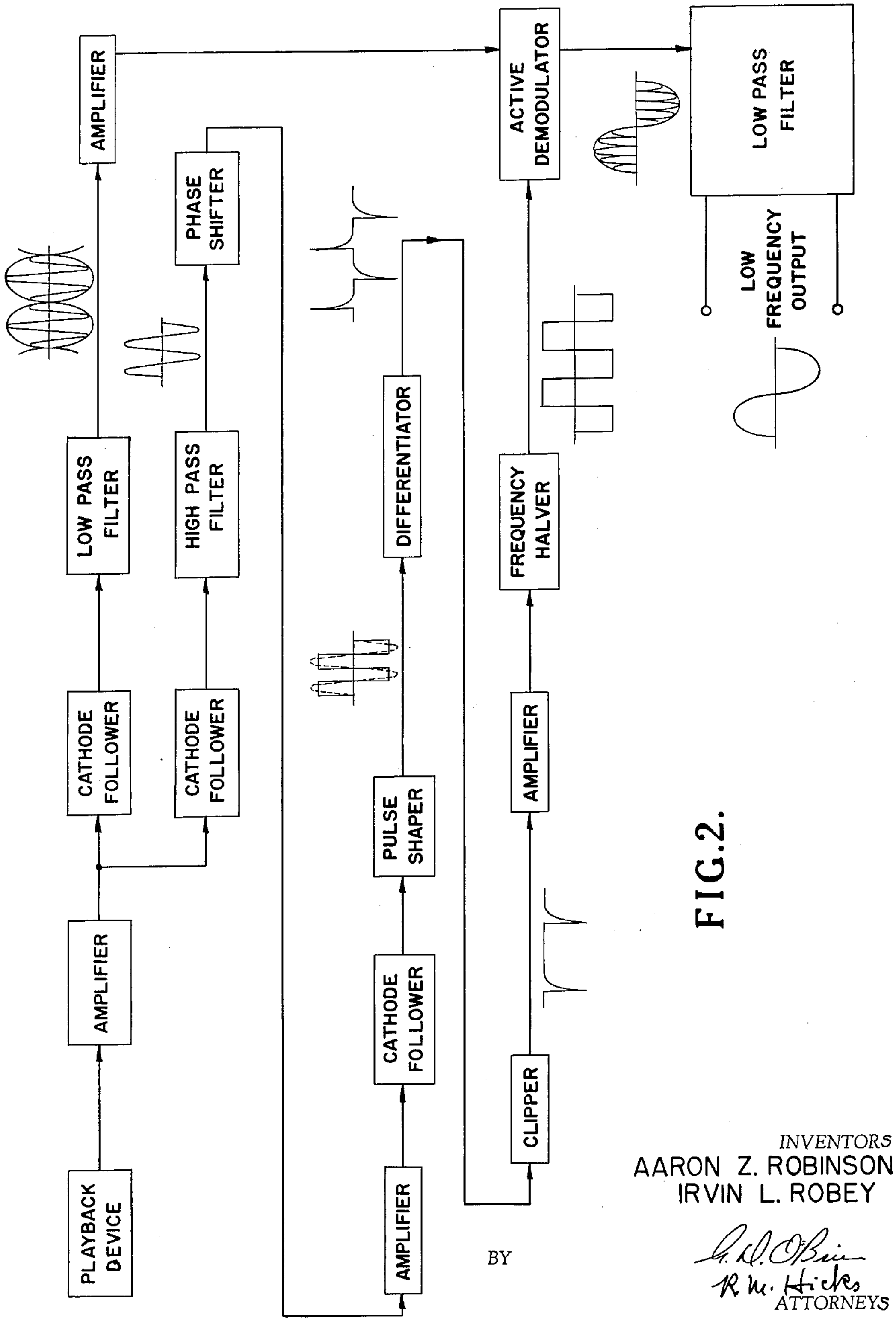

Other objects and many of the attendant advantages of this invention will be readily appreciated as the same becomes better understood by reference to the following detailed description when considered in connection with the accompanying drawings wherein:

Fig. 1 is a block diagram showing the relation of components of the low frequency recording system; and Fig. 2 is a block diagram showing the relation of components used in the low frequency play back system.

The principles of operation of the recording system of the instant invention may be more clearly understood by referring to Fig. 1 wherein is shown the relation of components of this portion of the invention. Since the various networks are composed of elements which, while connected in a manner to yield the improved results disclosed herein, are circuits which are well known individually to those skilled in the art. It is therefore not considered necessary to show the circuit details of such components but merely their novel arrangement to obtain the improved results of the instant invention. A low frequency source supplies a signal which modulates a one thousand cycle per second carrier in a balanced modulator wherein the carrier is suppressed. The one thousand cycle per second carrier is also simultaneously passed through a phase-shifting network into the frequency-doubling circuit. It is well known that a modulated wave obtained by modulating a carrier frequency by a low frequency signal will consist of three components, the unmodulated carrier component and two modulated components consisting respectively of the carrier frequency plus and the carrier frequency minus, the modulating frequency, or upper and lower sidebands. The doubled frequency plus the modulation components or sidebands from the modulator are then fed into an adder circuit and are amplified and recorded. The recording circuit may also include an oscilloscope connected ahead of the recorder for the purpose of monitoring the recorded frequencies. It is to be understood that the record may consist of a film, tape or other recording means. As previously indicated, the improved system of the instant invention has a dynamic range of approximately 60 db, whereas systems heretofore in use have a maximum dynamic range of approximately 36 db. The upper limit of the dynamic range is determined by the amount of signal that can be placed across the recording head without overcutting the grooves of the record and the lower limit is determined by the signal to noise ratio of the system. The increase in dynamic range made possible by the system of the instant invention is due principally to a reduction in intermodulation distortion, which, in one model was 20 db below the lowest secondary signal, that is, the distortion is 20 db below the lowest of a plurality of signals being intermodulated. This model had a dynamic range of about 56 db.

Over modulation is prevented in the system of the instant invention by the use of a balanced modulator which is a system wherein carrier is applied to the modulator and in the presence of a selected modulation magnitude, adjustment at which is such that there is little or no output when the modulating signal is zero. When the modulation magnitude is varied the state of balance is upset and the output is developed, the envelope of which follows the modulation magnitude. Where the adjustment is such that balance attained in the presence of carrier and zero magnitude or no modulation the carrier is suppressed and side band energy or modulation components output only is developed.

Balanced modulators, for example using triodes in push-pull are shown in the Massachusetts Institute of Technology, Radiation Laboratory Series Text No. 19, titled "Wave Forms" published in 1949 by McGraw-Hill Book Company in Chapter 11. A low frequency input signal is obtained from a phase inverter, the push-pull output of which is applied to the grids of the balanced triodes in a typical balanced modulator. When tubes of equal characteristics and cathode resistors of equal value are used in such modulators, a carrier gives equal voltages when the input signal is zero and the carrier is suppressed in the differential output of the push-pull triode modulators.

By using in the instant invention a frequency of recording that is twice that of the carrier, there is available for use in the demodulator of the play back system a control signal that will at all times be the same as the carrier which is necessary in an active type demodulator.

The phase shifter circuit insures that the 2000 cycle carrier will be in phase with the modulation components when they are combined in the adder circuit.

The play back system used in conjunction with the recording system of the instant invention is shown in block diagram form in Fig. 2. The signal output from the record which includes the modulation components and the 2000 cycle per second signal is passed through a pre-amplifier into two cathode followers. The cathode followers provide a proper impedance match to the respective filter circuits. The modulation components of the low frequency signal are selected by the low pass filter, amplified and fed to the active or ring type demodulator. The output from the second cathode follower is fed into a high pass filter which passes only the 2000 cycle per second signal. This filter is composed of two sections, one section of which cuts off all frequencies below 2000 cycles per second and the other section which cuts off all frequencies above 2000 cycles per second. This signal is then passed to a phase shifting network that adjusts the phase of the 2000 cycle per second signal and the modulation components so as to give a maximum output from the demodulator. The output of the phase shifter is fed into an amplifier and cathode follower and then into a pulse shaper or square wave generator. The cathode follower provides a proper impedance match to the pulse shaping circuit. The 2000 cycle per second sinusoidal voltage is fed to the pulse shaper where the peaks are clipped producing a square wave output voltage. This square wave output of the pulse shaper is applied to the differentiating or pulse sharpening circuit which converts the square waves into periodic pulses having sharp rises which are alternately positive and negative and of short duration. The positive peaks of the differentiated pulses are then removed by the clipper circuit following the differentiating circuit. The negative pulses trigger the frequency halving circuit which is an Eccles-Jordan type trigger circuit. The trigger circuit, when normally operating, remains at a stable condition wherein one tube is conducting and the other tube is cut off. This condition remains until a trigger pulse, such as the negative pulses from the clipper circuit, is applied which causes a reversal in the above conditions of conduction in the tubes. Such reversal in the tube conditions occurs each time a pulse occurs and since the positive peaks have been clipped the rate of recurrence is one half that of the 2000 cycles per second or 1000 cycles per second. The resulting wave shape of the output of the frequency halving circuit is a square wave having a frequency of 1000 cycles per second which, after being amplified, is used to provide a switching action in the ring type or active demodulator circuit. Whereas in the recording process a 1000 cycle per second sinusoidally varying signal was fed into the balanced modulator and served as a carrier modulated by the low frequency signals, in the play back system the square wave output of the frequency halving circuit is used to control the switching action of the demodulator. The switching action causes a 180° reversal in the direction of current flow in the output of the ring type demodulator. The active or ring type demodulator is a phase sensitive device used to demodulate the wave form obtained from the output of the low pass filter of the play back circuit and shown on Fig. 2 which is the same as the output of the balanced modulator of the recording system. Circuits of this type are well known and their operation and circuitry are described in chapter 11 of the text previously cited regarding balanced modulators. The effect of this circuit on the wave form shown at the output of the low pass filter in Fig. 2 which is fed into the demodulator is to reverse the negative excursions or portions of the cycle of this wave form whenever positive square wave pulses, which are in phase with the modulating components of the low frequency signal, are also fed into the demodulator from the frequency halver and to reverse the positive portions of the cycle of this wave form whenever negative pulses are fed to the demodulator. The resulting wave form is shown in Fig. 2 at the output of the demodulator. Passing this wave form through a low pass filter results in a final output of a low frequency signal in the original form as required.

The system of the instant invention therefor provides a recording and play back arrangement which provides for greatly increased dynamic range, elimination of such factors as turntable "wow," line frequency variation, and over modulation of low frequency signals.

Obviously many modifications and variations of the present invention are possible in the light of the above teachings. It is therefore to be understood that within the scope of the appended claims the invention may be practiced as specifically described.

What is claimed as new and desired to be secured by Letters Patent of the United States is:

1. A recording system comprising a low frequency signal source, means for producing a carrier, means connected to said signal source and carrier producing means for modulating said carrier by said low frequency signal source and suppressing said carrier to produce modulating components in the output thereof, carrier frequency multiplying means, means for combining said modulating components and said multiplied carrier frequency, recording means connected to said last named means whereby said multiplied carrier frequency signal and said components of modulation are recorded on a physical record.

2. A recording system comprising a low frequency signal source, a carrier signal source, a balanced modulator arranged to provide carrier suppression connected to said low frequency and said carrier signal sources for modulating said carrier and producing modulation components thereof, carrier frequency multiplying means, means for combining said components of modulation and said multiplied carrier frequency, means for recording the combined components of modulation and multiplied carrier frequency, said low frequency signal being effective to control said balanced modulator to suppress said carrier in the absence of low frequency signal input thereby preventing over modulation and increasing the dynamic range of frequencies to be recorded.

3. In a system for recording signals and reproducing the recorded signals comprising means for generating a low frequency sinusoidally varying signal, means for generating a sinusoidally varying carrier signal, balanced modulator means connected to both said low frequency and said carrier generating means wherein said carrier is modulated by said low frequency signal thus producing components of modulation and said carrier is suppressed in the absence of said low frequency signal thereby preventing over-modulation and increasing the dynamic range of recorded frequencies, carrier frequency multiplying means, circuit means for combining the components of modulation and said multiplied carrier signal, means for translating the combined signals into a physical record, means to convert the record to said combined signals, said converting means connected to first and second branch circuits of said system, means for separating said combined signals into said components of modulation and said multiplied frequency signals connected respectively in said first and second branch circuits, said second branch circuit including means providing for proper phase relation of said components of modulation and said multiplied carrier frequency and means for restoring said multiplied carrier to its fundamental frequency, means common to said first and second branch circuits for demodulating said components of modulation, said restored carrier effective to control the switching action of said demodulating means whereby the output of said demodulator is unidirectional during corresponding phase portions of said restored carrier, a low pass filter connected to the output of said demodulator whereby said demodulated original low frequency signal is reproduced.

4. A sound reproducing system comprising a signal source combining sinusoidally varying low frequency modulating components and relatively higher frequency sinusoidally varying constant amplitude signals, play back means connected to said signal source, first and second branch circuits in said system, means arranged in said first and second branch circuits respectively for separating said low and relatively higher frequency signals, phase sensitive demodulator means common to said branch circuits, said modulating components being applied to said demodulating means, said second branch circuit including pulse shaping means for converting said sinusoidally constant amplitude signals to square wave pulses, pulse differentiating means, pulse clipping means, frequency halving means providing square wave output pulses, the square wave output pulses of said frequency halving means being applied in phase with said modulating components to said demodulating means to effect a switching action in the direction of current flow in the output of said demodulator, low pass filter means connected in the output of said demodulator means yielding a low frequency signal as originally recorded.

5. A method for recording and reproducing low frequency signals including modulation of a carrier frequency with a low frequency signal, suppressing said carrier signal in the absence of low frequency signals, simultaneously independently multiplying said carrier frequency, adding said components of modulation and said multiplied carrier, recording said combined signals and simultaneously monitoring said combined signals during the recording process, thereafter applying said combined signals to a reproducing system, separating said combined signals by filtering action, applying said filtered components of modulation to a phase sensitive demodulator, simultaneously applying said filtered multiplied carrier signals in phase relation with said components of modulation to a square wave generating circuit, differentiating said square wave pulses and thereafter removing the positive portions of said differentiated square wave pulses, applying the remaining pulses to a frequency halving circuit to provide square wave pulses of half the multiplied carrier frequency in phase relation with said modulating components to a phase sensitive demodulator thus providing unidirectional flow of the current output of said demodulator during corresponding phase reversals of said square wave pulses, applying said demodulated signals to a low pass filter thereby reproducing a low frequency signal as originally recorded.

6. A method for reproducing recorded combined low frequency components of modulation and a multiplied carrier frequency including separating said components of modulation and said multiplied carrier by simultaneously separating said combined signals in phase relation, converting the multiplied carrier into square wave pulses of reduced frequency in phase with the modulation components, phase demodulating said modulation components with said square wave pulses and detecting the demodulated signal to provide a low frequency signal as originally recorded.

7. A method of recording low frequency signals including modulating a carrier signal with low frequency signals in a balanced modulator providing suppression of the carrier frequency during periods of zero low frequency signal thereby providing upper and lower sideband output, and simultaneously with said modulating process doubling said carrier frequency, combining said sideband output with said doubled carrier frequency and recording said combined signals on a record and simultaneously therewith monitoring said recorded signals.

8. A method of reproducing recordings on a record combining sinusoidally varying upper and lower side bands of low frequency signals and a simultaneously varying multiplied carrier frequency including separating said low frequency and multiplied carrier frequency signals by simultaneously filtering said recordings, converting said multiplied carrier frequency signals to square wave pulses and thereafter reducing the frequency of said carrier signals, demodulating said low frequency signals with said reduced frequency square wave pulses to provide unidirectional current flow in the output of said demodulator during portions of said upper and lower side bands which correspond in phase and polarity to said square wave pulses, filtering said demodulator output whereby low frequency signals as originally recorded are reproduced.

9. A method of recording and reproducing sinusoidally varying low frequency signals including modulating a sinusoidally varying carrier with said low frequency signals in a carrier suppressed balanced modulator and simultaneously therewith multiplying said carrier frequency, the upper and lower side bands of said low frequency signals and said multiplied carrier frequency being in phase relation, thereafter recording said added signals on a physical record and simultaneously monitoring said recordings, translating said recorded signals, simultaneously filtering said multiplied carrier frequency and said side bands, converting said multiplied carrier frequency to square wave pulses and reducing the frequency of said pulses, said side bands and said reduced frequency pulses being in phase relation, phase demodulating said side bands by controlling the output of said device with said square wave pulses to obtain unidirectional current flow during portions of said side bands which correspond in phase and polarity with said square wave pulses, filtering the demodulated side bands whereby low frequency signals as originally recorded are reproduced.

References Cited in the file of this patent

UNITED STATES PATENTS

| | | |
|---|---|---|
| 1,550,660 | Affel | Aug. 24, 1925 |
| 2,507,178 | Usselman | May 9, 1950 |
| 2,521,623 | Arndt et al. | Sept. 5, 1950 |